US008423043B2

(12) United States Patent
Kazmi

(10) Patent No.: US 8,423,043 B2
(45) Date of Patent: Apr. 16, 2013

(54) METHOD AND APPARATUS FOR LOCATION FINGERPRINTING

(75) Inventor: Muhammad Ali Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 352 days.

(21) Appl. No.: 12/558,931

(22) Filed: Sep. 14, 2009

(65) Prior Publication Data

US 2011/0065450 A1   Mar. 17, 2011

(51) Int. Cl.
*H04W 24/00* (2009.01)
(52) U.S. Cl.
USPC .................................................. 455/456.1
(58) Field of Classification Search ....... 455/456.1–457, 455/404.1–404.2, 414.1–414.4, 446, 67.11; 370/250, 252; 340/539.13, 539.21
See application file for complete search history.

(56) References Cited

U.S. PATENT DOCUMENTS

| | | | |
|---|---|---|---|
| 2004/0259575 A1* | 12/2004 | Perez-Breva et al. | 455/456.5 |
| 2005/0197136 A1 | 9/2005 | Friday et al. | |
| 2005/0246334 A1 | 11/2005 | Tao et al. | |
| 2006/0019679 A1 | 1/2006 | Rappaport et al. | |
| 2006/0125692 A1* | 6/2006 | Wang et al. | 342/451 |
| 2006/0240842 A1 | 10/2006 | Spain et al. | |
| 2008/0143605 A1 | 6/2008 | Bornholdt | |
| 2009/0005063 A1 | 1/2009 | Malik et al. | |

OTHER PUBLICATIONS

Riback, M. et al. "Carrier Frequency Effects on Path Loss." IEEE 63rd Vehicular Technology Conference, 2006 (VTC 2006-Spring), vol. 6, May 7-10, 2006, pp. 2717-2721.*
Sayed, A. H. et al. "Network-Based Wireless Location." IEEE Signal Processing Magazine, Jul. 2005, pp. 24-40.
3rd Generation Partnership Project. "Uplink Power Control for LTE-Advanced." 3GPP TSG RAN WG1 #58 Meeting, R1-093322, Shenzhen, China, Aug. 24-28, 2009.
3rd Generation Partnership Project. "Multi-carrier UL Power Control for LET-A." 3GPP TSG RAN WG1 Meeting #58, R1-093282, Shenzhen, China, Aug. 24-28, 2009.
Zhu, J. et al. "Indoor/Outdoor Location of Cellular Handsets Based on Received Signal Strength." IEEE 61st Vehicular Technology Conference, 2005 (VTC 2005-Spring), vol. 1, May 30-Jun. 1, 2005, pp. 92-96.
Blaunstein, N., et al., "Prediction of Frequency Dependence of Path Loss and Link-Budget Design for Various Terrestrial Communication Links," IEEE Transactions on Antennas and Propagation, Oct. 2004, pp. 2719-2729, vol. 52, No. 10.
Ladha, C., et al., "Mitigating propagation errors for indoor positioning in wireless sensor networks," Mobile Adhoc and Sensor Systems, Oct. 1, 2007, IEEE International Conference, pp. 1-6.

* cited by examiner

*Primary Examiner* — Marisol Figueroa
*Assistant Examiner* — Erica Navar
(74) *Attorney, Agent, or Firm* — Coats & Bennett, P.L.L.C.

(57) ABSTRACT

Methods and apparatus herein facilitate accurate estimation of a mobile terminal's location via location fingerprinting. Specifically, the methods and apparatus obtain a radio fingerprint of the mobile terminal's location based on signal measurements (e.g., signal strength, signal quality, or path loss) performed at a radio frequency distinct from that used to obtain the reference radio fingerprints. The methods and apparatus transform the radio fingerprint, or the reference radio fingerprints, or both, based on that distinction, such as by offsetting signal measurements of the radio fingerprint by an amount determined based on theoretical or experimental models of the dependency of the signal measurements on the radio frequency at which they are performed. The radio fingerprint of the mobile terminal's location may then be compared to the reference radio fingerprints, to accurately estimate the mobile terminal's location despite the radio fingerprint and the reference radio fingerprints having been obtained using different frequencies.

22 Claims, 6 Drawing Sheets

| REFERENCE LOCATION | REFERENCE RADIO FINGERPRINTS ($F_{r_n}$) |
|---|---|
| $L_{r_1}$ | $SM_{r_1,1}$, $SM_{r_1,2}$, $SM_{r_1,3}$ |
| $L_{r_2}$ | $SM_{r_2,1}$, $SM_{r_2,2}$, $SM_{r_2,3}$ |
| $L_{r_3}$ | $SM_{r_3,1}$, $SM_{r_3,2}$, $SM_{r_3,3}$ |
| ⋮ | |
| ⋮ | |
| $L_{r_N}$ | $SM_{r_N,1}$, $SM_{r_N,2}$, $SM_{r_N,3}$ |

METHOD AND APPARATUS FOR LOCATION FINGERPRINTING

TECHNICAL FIELD

The present invention relates generally to wireless communication systems, and particularly to wireless communication systems configured to estimate the location of a mobile terminal using location fingerprinting.

BACKGROUND

The ability to estimate the physical location of a mobile terminal in a wireless communication system finds broad utility across a range of applications, including emergency dispatch services, navigation systems, information or marketing services, and others. Many of these applications benefit from highly accurate location estimation, and indeed some even require it. In the United States, for example, standards adopted by the Federal Communications Commission (FCC) mandate that wireless service providers regularly estimate the location of a mobile terminal for emergency dispatch services within an accuracy of as little as 50 meters, depending on the type of location technology used by the provider.

Location fingerprinting offers perhaps one of the most promising approaches for reliably estimating location with such high accuracy, even in urban and indoor radio environments where other approaches fall short. Location fingerprinting is implemented in two phases: a training phase and a location estimation phase. During the training phase, the wireless service provider conducts an extensive survey of the service area to measure unique properties of the signal space at selected reference locations. At each reference location, for example, the provider may determine the set of radio access network nodes detectable from that location and measure the strength of signals received from each access node. Alternatively, the provider may measure the quality of those signals, the path loss, multi-path characteristics, or any other type of signal measurements with respect to each access node. The resulting set of signal measurements for a given reference location uniquely identifies that location as its radio fingerprint. The provider then stores the reference radio fingerprint of each reference location in a database together with the known coordinates of those locations.

During the location estimation phase, a mobile terminal performs the same sort of signal measurements to obtain a radio fingerprint of its unknown location. This radio fingerprint is then compared to the reference radio fingerprints to estimate the mobile terminal's location according to some pre-determined estimation algorithm. The single nearest-neighbor algorithm, for example, estimates the mobile terminal's location as being equal to that of the reference location having a reference radio fingerprint most similar to the radio fingerprint of the mobile terminal's location. Other estimation algorithms include the K-nearest neighbor algorithm, the weighted K nearest-neighbor algorithm, etc. By collecting reference radio fingerprints for reference locations chosen to be, e.g., every 3 to 5 meters, a wireless service provider can theoretically estimate a mobile terminal's location within an accuracy of just a few meters.

Some contexts complicate the above approach to location fingerprinting. For example, a wireless service provider often conducts the extensive site survey necessary for location fingerprinting when the wireless network is being deployed. As part of this survey, the provider obtains the reference radio fingerprints by performing signal measurements at one or more of the radio frequencies then available for use by the network and mobile terminal. New frequencies, however, can subsequently become available for use, e.g., if the provider acquires carriers at additional frequencies. This allows the provider to serve mobile terminals that support additional frequencies, carry out load balancing on different carriers with mobile terminals that support multiple frequencies, and otherwise increase capacity. Yet if the provider does not re-conduct the extensive site survey for these new frequencies, a time consuming and costly endeavor, a mobile terminal may obtain the radio fingerprint of its location by performing signal measurements at a radio frequency different from that used by the provider to obtain the reference radio fingerprints.

Many types of signal measurements used for location fingerprinting, such as signal strength and path loss, depend on the radio frequency at which they are performed. For example, two path loss measurements performed at the same location but at different radio frequencies may differ by as much as 10 dB. A difference in the radio frequency used for signal measurements, therefore, may cause significant error in the location estimated via location fingerprinting, on the order of hundreds or thousands of meters, threatening the ability of location fingerprinting to otherwise meet the accuracy demands of many wireless communication applications.

SUMMARY

Methods and apparatus taught herein facilitate accurate estimation of a mobile terminal's location via location fingerprinting, even if the mobile terminal obtains its radio fingerprint with a radio frequency different from that used by the wireless service provider to obtain reference radio fingerprints. Instead of requiring the wireless service provider to obtain new reference radio fingerprints tailored for each new frequency that becomes available, the methods and apparatus compensate for error in the location estimate caused by the fingerprints having been obtained using different frequencies.

Specifically, the methods and apparatus obtain a radio fingerprint of the mobile terminal's location based on signal measurements (e.g., signal strength, signal quality, or path loss) performed at a radio frequency distinct from that used to obtain the reference radio fingerprints. The methods and apparatus transform the radio fingerprint, or the reference radio fingerprints, or both, based on that distinction.

In one embodiment, the methods and apparatus transform the radio fingerprint, or the reference radio fingerprints, or both, by offsetting signal measurements of the radio fingerprint, or signal measurements of the reference radio fingerprints, or both. The amount by which to offset these signal measurements may be determined based on theoretical models of the dependency of the signal measurements on the radio frequency at which they are performed. These theoretical models may also account for the type of radio environment that the signal measurements are performed.

Regardless of the specific manner in which the radio fingerprint, or the reference radio fingerprints, or both are transformed, the radio fingerprint of the mobile terminal's location may then be compared to the reference radio fingerprints, to accurately estimate the mobile terminal's location despite the radio fingerprint and the reference radio fingerprints having been obtained using different frequencies. In some embodiments, the methods and apparatus of the present invention actually compute this location estimate after transforming the radio fingerprint, or the reference radio fingerprints, or both as described above. In other embodiments, however, the methods and apparatus transform the radio fingerprint, or the reference radio fingerprints, or both, while another node in the wireless communication system actually computes the location estimate.

In one embodiment, for example, the mobile terminal itself transforms the radio fingerprint, or the reference radio fingerprints, or both, and also estimates its own location. In another embodiment, the mobile terminal sends the radio fingerprint of its location to a radio access network (RAN) node. In this case, the RAN node transforms the radio fingerprint and sends the transformed radio fingerprint to another node in the wireless communication network, such as a node referred to herein as a positioning node. The positioning node actually estimates the mobile terminal's location. In yet another embodiment, the RAN node relays the radio fingerprint it receives from the mobile terminal (with or without modification) to the positioning node, whereupon the positioning node transforms the radio fingerprint, or the reference radio fingerprints, or both, and estimates the mobile terminal's location.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 1B illustrates one embodiment of a reference radio fingerprint database utilized in the wireless communication system shown in FIG. 1A.

DETAILED DESCRIPTION

Figure 1A:
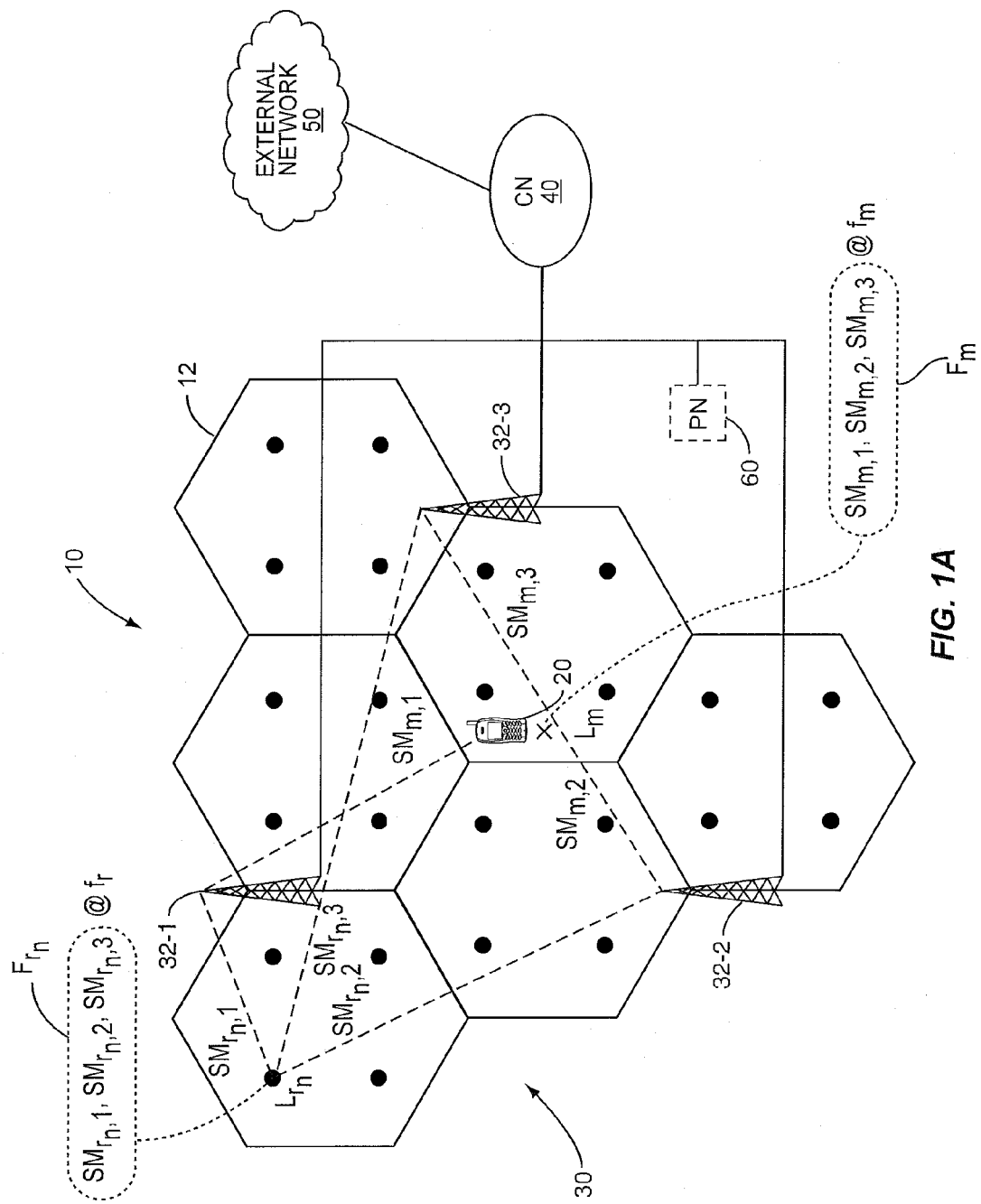
FIG. 1A illustrates one embodiment of a wireless communication system utilizing location fingerprinting to estimate the location of a mobile terminal.

FIG. 1A illustrates one embodiment of a wireless communication system 10, which includes a mobile terminal 20, a Radio Access Network (RAN) 30, and a Core Network (CN) 40. The mobile terminal 20, RAN 30, and CN 40 enable a user to access one or more external networks 50, such as the Public Switched Telephone Network or the Internet.

The RAN 30 includes a number of nodes 32 distributed across the wide geographic area served by the wireless communication system 10. Each RAN node 32 provides radio coverage for one or more portions of that geographic area, referred to as cells 12. The mobile terminal 20 may move within or between cells 12 and communicate with one or more RAN nodes 32 at any given location. Each RAN node 32 in turn directly or indirectly connects to the CN 40, which enables communication between RAN nodes 32, other parts of the system 10, and ultimately the external networks 50.

The wireless communication system 10 exploits unique properties of the signal space at various spots in its service area to estimate the physical or geographical location of the mobile terminal 20 via location fingerprinting. In a training phase of location fingerprinting, a plurality of reference locations $L_{r_1} \ldots L_{r_N}$ are defined in the service area e.g. by the wireless service provider deploying the system 10. At each reference location $L_{r_n}$, signal measurements are performed with respect to each RAN node 32 detectable from that location. In FIG. 1A, for example, three RAN nodes 32-1, 32-2, and 32-3 are detectable at a given reference location $L_{r_n}$. Accordingly, signal measurements $SM_{r_n,1}$ are performed with respect to RAN node 32-1, signal measurements $SM_{r_n,2}$ are performed with respect to RAN node 32-2, and signal measurements $SM_{r_n,3}$ are performed with respect to RAN node 32-3. The resulting set of signal measurements $SM_{r_n,1}$, $SM_{r_n,2}$, $SM_{r_n,3}$ for a given reference location $L_{r_n}$ uniquely identifies that location as its reference radio fingerprint $F_{r_n}$. The wireless communication system 10 stores reference radio fingerprints $F_{r_n}$ each of the reference locations $L_{r_1} \ldots L_{r_N}$ in a database 70 (see FIG. 1B), along with known coordinates of those locations. As described in more detail below, the reference fingerprint database 70 may be stored in any entity within the system 10, including the mobile terminal 20 itself, the RAN nodes 32, or even a positioning node 60.

Various types of signal measurements $SM_{r_n,1}$, $SM_{r_n,2}$, $SM_{r_n,3}$ may be utilized to obtain the reference radio fingerprints $F_{r_n}$. In one embodiment, for example, the signal measurements comprise received signal strength, as indicated by e.g. the received signal code power (RSCP) on the Common Pilot Channel (CPICH) in WCDMA UTRAN FDD systems or reference signal received power (RSRP) in Evolved UTRAN, which is often referred to as long term evolution (LTE). In other embodiments, the signal measurements comprise received signal quality, as indicated by the received energy per chip ($E_c$)) on the CPICH divided by the total noise power density ($N_o$) in WCDMA UTRAN FDD systems or reference signal received quality (RSRQ) in Evolved UTRAN. In yet other embodiments, the signal measurements comprise path loss, path gain, multi-path characteristics, timing characteristics (e.g., round trip time, one way propagation delay, mobile terminal and/or BS receive (Rx)-transmit (Tx) time difference, etc.), or any other type of signal measurements that, when collected with respect to multiple RAN nodes 32, uniquely identify a particular geographical location.

Regardless of the particular type of signal measurements $SM_{r_n,1}$, $SM_{r_n,2}$, $SM_{r_n,3}$ used to obtain the reference radio fingerprints $F_{r_n}$, those signal measurements are each performed at a specific reference radio frequency $f_r$. In the location estimation phase of location fingerprinting, a radio fingerprint $F_m$ of the mobile terminal's currently unknown location $L_m$ is obtained based on the same type of signal measurements $SM_{m,1}$, $SM_{m,2}$, $SM_{m,3}$, but the mobile terminal 20 performs those measurements at a different radio frequency $f_m$. Because the types of signal measurements described above depend on the frequency with which they are performed, this difference would otherwise cause significant error in a location estimated by comparing the radio fingerprint $F_m$ to the reference radio fingerprints $F_{r_n}$.

Figure 2:
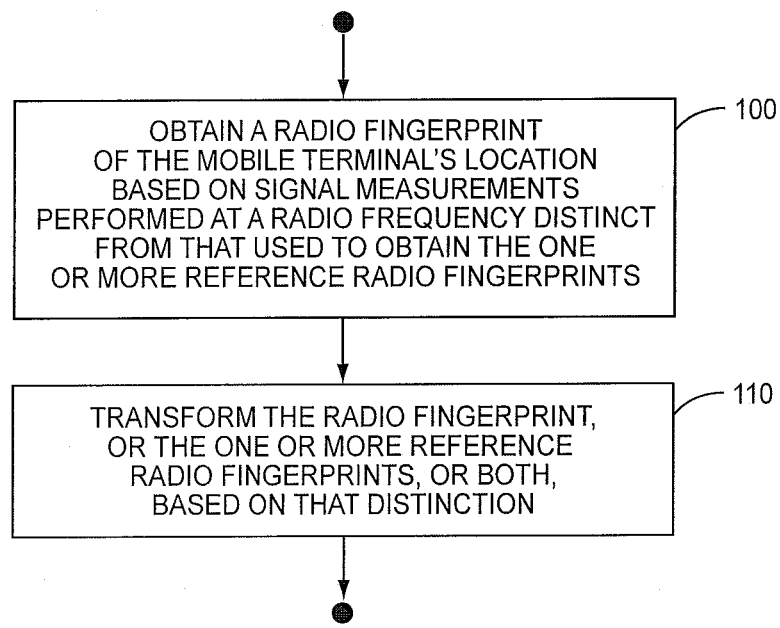
FIG. 2 is a logic flow diagram illustrating one embodiment of a method for estimating the location of a mobile terminal via location fingerprinting.

FIG. 2 illustrates a method implemented in the wireless communication system 10 that compensates for this error. As shown in FIG. 2, the method includes obtaining a radio fingerprint $F_m$ of the mobile terminal's location $L_m$ based on signal measurements $SM_{m,1}$, $SM_{m,2}$, $SM_{m,3}$ performed at a radio frequency distinct from that used to obtain the reference radio fingerprints $F_{r_n}$ (Block 100). The method further includes transforming the radio fingerprint $F_m$, or the reference radio fingerprints $F_{r_n}$, or both, based on that distinction (Block 110). By transforming the radio fingerprints $F_m$, $F_{r_n}$ obtained, the method facilitates accurate location estimation without requiring that a wireless service provider re-conduct the costly site survey to obtain new reference radio fingerprints for each newly available frequency.

In one embodiment, the method transforms the radio fingerprint $F_m$, or the reference radio fingerprints $F_{r_n}$, or both, by offsetting signal measurements $SM_{m,1}$, $SM_{m,2}$, $SM_{m,3}$ of the radio fingerprint $F_m$, or signal measurements $SM_{r_n,1}$, $SM_{r_n,2}$, $SM_{r_n,3}$ of the reference radio fingerprints $F_{r_n}$, or both. The amount by which to offset these signal measurements may be determined based on theoretical models of the dependency of the signal measurements on the frequency at which they are performed. If the signal measurements comprise path loss measurements, for example, those signal measurements may be offset by an amount determined according to the free space model:

$$\Delta L = 20\log_{10}\frac{f_m}{f_r} \quad (1)$$

where $\Delta L$ is the difference between otherwise identical path loss measurements performed at different frequencies $f_m$, $f_r$. According to (1), path loss measurements $SM_{m,1}$, $SM_{m,2}$, $SM_{m,3}$ performed at a frequency $f_m$ of 1800 MHz are approximately 6 dB greater than path loss measurements $SM_{r_n,1}$, $SM_{r_n,2}$, $SM_{r_n,3}$ performed at a frequency $f_r$ of 900 MHz (a difference that can cause an error in the location estimate of more than 1 km). In this example, then, the method offsets path loss measurements $SM_{m,1}$, $SM_{m,2}$, $SM_{m,3}$ by −6 dB, offsets path loss measurements $SM_{r_n,1}$, $SM_{r_n,2}$, $SM_{r_n,3}$ by +6 dB, or distributes the offset among both path loss measurements $SM_{m,1}$, $SM_{m,2}$, $SM_{m,3}$ and $SM_{r_n,1}$, $SM_{r_n,2}$, $SM_{r_n,3}$ (e.g., by offsetting path loss measurements $SM_{m,1}$, $SM_{m,2}$, $SM_{m,3}$ by −3 dB and path loss measurements $SM_{r_n,1}$, $SM_{r_n,2}$, $SM_{r_n,3}$ by +3 dB).

Other theoretical models besides the free space model may be used to determine the amount by which to offset signal measurements. More sophisticated theoretical models also account for the type of radio environment that the signal measurements are performed. In the context of the above example, path loss measurements $SM_{m,1}$, $SM_{m,2}$, $SM_{m,3}$ performed at a frequency $f_m$ of 1800 MHz may actually be 7 dB greater than path loss measurements $SM_{r_n,1}$, $SM_{r_n,2}$, $SM_{r_n,3}$ performed at a frequency $f_r$ of 900 MHz, if performed in an urban area, and 9-10 dB greater if performed in a sub-urban area. Accounting for radio environment effects, therefore, the signal measurements may be offset by an amount determined according to:

$$\Delta L = C\log_{10}\frac{f_m}{f_r} \quad (2)$$

where C varies depending on the type of radio environment (e.g., C=23 for urban environments, and C=30 for sub-urban environments). This and other theoretical models are discussed more fully by Mathias Riback et al. in "Carrier Frequency Effects on Path Loss," IEEE VTC 2006 Spring.

The amount by which to offset signal measurements may alternatively be determined based on empirical measurements. In one embodiment, for example, the RAN nodes 32 collect signal measurement statistics performed over different frequencies, including the reference frequency $f_r$. Based on those statistics, the RAN nodes 32 dynamically determine offset amounts for each frequency with respect to the reference frequency $f_r$. To also account for radio environment effects, the RAN nodes 32 may individually determine offset amounts for different types of radio environments.

Of course, those skilled in the art will appreciate other ways to determine the offset amounts when the radio fingerprints are transformed by offsetting signal measurements thereof. In fact, those skilled in the art will also appreciate other ways to transform the radio fingerprints so as to compensates for error in the location estimate caused by the radio fingerprint $F_m$ having been obtained based on signal measurements $SM_{m,1}$, $SM_{m,2}$, $SM_{m,3}$ performed at a frequency different from that of the signal measurements $SM_{r_n,1}$, $SM_{r_n,2}$, $SM_{r_n,3}$ used to obtain the reference radio fingerprints $F_{r_n}$. Regardless of the specific manner in which the radio fingerprints are transformed, therefore, the radio fingerprint $F_m$ may then be compared to the reference radio fingerprints $F_{r_n}$, to accurately estimate the mobile terminal's location $L_m$.

In some cases, however, the gain in accuracy of the location estimate due to the above-described transformation may be small, negligible, or not needed e.g., when the radio frequency $f_m$ used to obtain the radio fingerprint $F_m$ does not significantly differ from the reference frequency $f_r$. Thus, in one embodiment, the method transforms the radio fingerprint $F_m$, or the reference radio fingerprints $F_{r_n}$, or both, if the difference between the radio frequency $f_m$ and the reference frequency $f_r$ exceeds a pre-determined threshold. Such pre-determined threshold may be derived, for example, to allow for a certain amount of error in the location estimate (e.g., to allow for a location estimate accurate within as much as 50 meters 67% of the time and 150 meters 95% of the time for the mobile terminal based location methods, in accordance with FCC regulations in the United States).

In other embodiments, the method transforms the radio fingerprint $F_m$, or the reference radio fingerprints $F_{r_n}$, or both, if the radio frequency $f_m$ and the reference frequency $f_r$ belong to different pre-determined frequency bands. For example, 3GPP TS 25.101, "User Equipment (UE) radio transmission and reception (FDD)" and 3GPP TS 25.104, "Base station (BS) radio transmission and reception (FDD)" specify frequency bands for WCDMA UTRAN FDD systems. In this case, the mobile terminal 20 may obtain the radio fingerprint $F_m$ of its unknown location $L_m$ based on signal measurements $SM_{m,1}$, $SM_{m,2}$, $SM_{m,3}$ performed at approximately 1810 MHz, which is defined in WCDMA UTRAN FDD systems as being within WCDMA UTRAN FDD frequency band III. If the reference radio fingerprints $F_{r_n}$ obtained based on signal measurements $SM_{r_n,1}$, $SM_{r_n,2}$, $SM_{r_n,3}$ performed at approximately 890 MHz, which is defined as being within WCDMA UTRAN FDD frequency band V, the method transforms the radio fingerprint $F_m$, or the reference radio fingerprints $F_{r_n}$, as described above. But if the reference radio fingerprints $F_{r_n}$ obtained based on signal measurements $SM_{r_n,1}$, $SM_{r_n,2}$, $SM_{r_n,3}$ performed at approximately 1880 MHz, though the radio frequency $f_m$ and the reference frequency $f_r$ differ, the method does not transform the radio fingerprints because the frequencies fall within the same WCDMA UTRAN FDD frequency band III.

Figure 3:
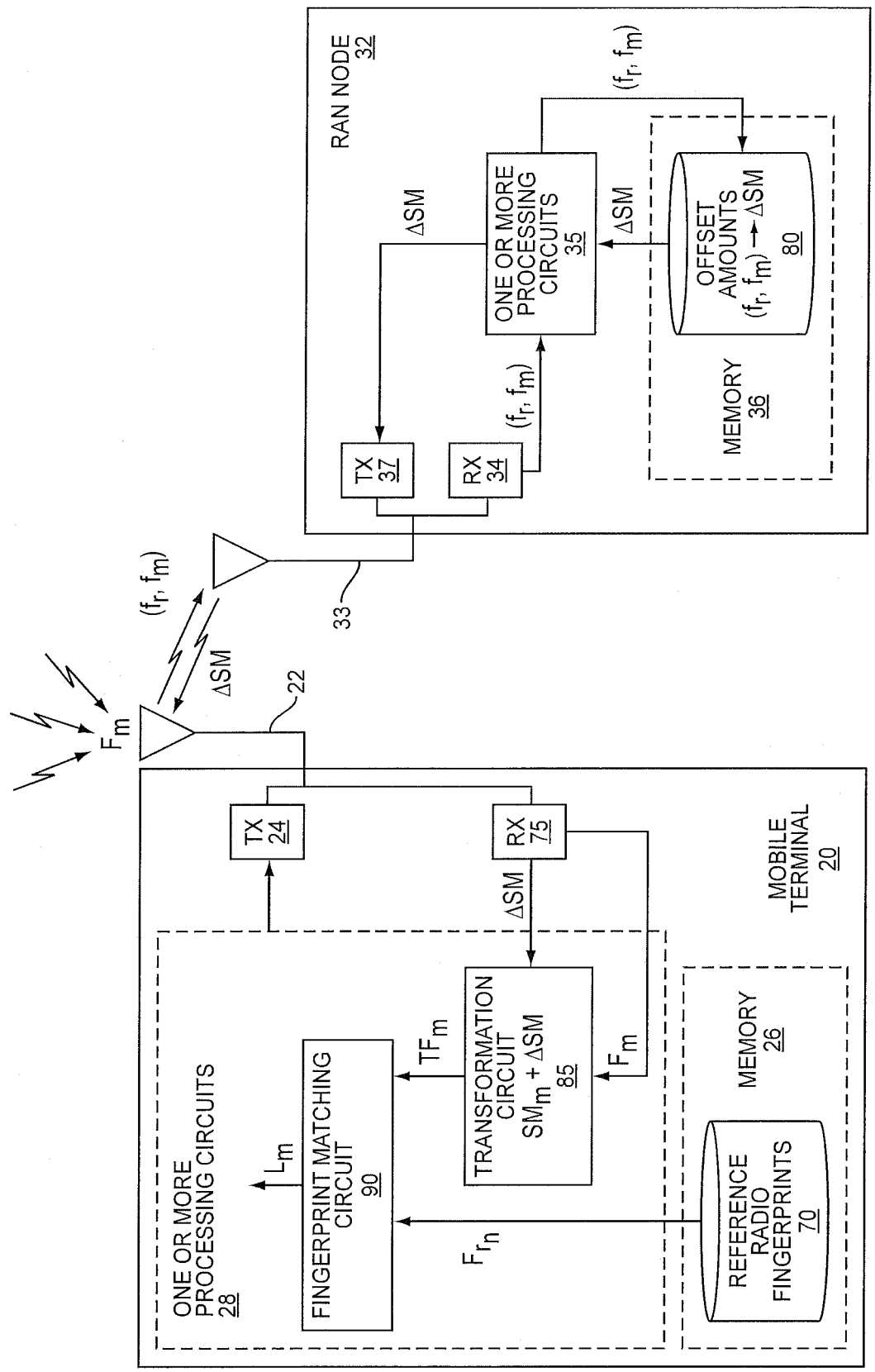
FIG. 3 is a block diagram illustrating one embodiment of a mobile terminal that is configured to implement the method shown in FIG. 2.

Transformation of the radio fingerprint $F_m$, or the reference radio fingerprints $F_{r_n}$, may be completed by the mobile terminal itself, or by some other apparatus in the wireless communication system 10 in a distributed fashion. As one example, FIG. 3 illustrates an embodiment wherein the mobile terminal 20 itself transforms the radio fingerprint $F_m$, by offsetting signal measurements of the radio fingerprint $F_m$ by an amount $\Delta SM$ retrieved from one of the RAN nodes 32. In this embodiment, the mobile terminal 20 also stores the database 70 of reference radio fingerprints $F_{r_n}$ and computes the actual estimate of its location $L_m$ by comparing the radio fingerprint $F_m$, as transformed, to the reference radio fingerprints $F_{r_n}$.

Specifically, a memory 26 in the mobile terminal 20 stores the database 70 of reference radio fingerprints $F_{r_n}$. Each reference radio fingerprint $F_{r_n}$ is associated with a given reference location $L_{r_n}$ and was obtained based on signal measurements $SM_{r_n,1}$, $SM_{r_n,2}$, $SM_{r_n,3}$ performed at a given reference frequency $f_r$ as described above. A receiver 75 in the mobile terminal 20 obtains the radio fingerprint $F_m$ of the unknown location $L_m$ based on measurements $SM_{m,1}$, $SM_{m,2}$, $SM_{m,3}$ of signals received from RAN nodes 32 via the antenna 22, at a radio frequency $f_m$. The RAN node 32 may have, for example, requested the mobile terminal 20 to perform measurements at that frequency $f_m$, such that despite having knowledge of the reference frequency $f_r$, the mobile terminal 20 must obtain the radio fingerprint $F_m$ of its location $L_m$ using a different frequency. To compensate for error in the location estimate caused by the fingerprints having been obtained using different frequencies, a transmitter 24 sends an indication of the reference frequency $f_r$ to a RAN node 32, as well as an indication of the radio frequency $f_m$ if not already known to the RAN node 32.

A memory 36 in the RAN node 32 stores a table 80 of offset amounts $\Delta SM$ for offsetting the signal measurements $SM_{m,1}$, $SM_{m,2}$, $SM_{m,3}$ based on the difference between the radio frequency $f_m$ and the reference frequency $f_r$. This table 80 contains a plurality of offset amounts $\Delta SM$, each indicating an amount by which to offset signal measurements performed at a certain frequency, in relation to the reference frequency $f_r$. The table 80 may have been populated by any of the methods described above, such as via empirical signal measurements collected across different frequencies by the RAN node 32, for specific radio environments. One or more processing circuits 35 then retrieve from the table 80 the offset amount $\Delta SM$ mapped to radio frequency $f_m$ and reference frequency $f_r$ acquired from the mobile terminal 20 by the receiver 34. A transmitter 38 sends the retrieved offset amount $\Delta SM$ to the mobile terminal 20 (e.g., upon call setup, after reselection of a cell 12, or after handover between RAN nodes 32).

A transformation circuit 85 in the mobile terminal 20 transforms the radio fingerprint $F_m$ by offsetting signal measurements $SM_{m,1}$, $SM_{m,2}$, $SM_{m,3}$ thereof by the offset amount $\Delta SM$ received from the RAN node 32. Such transformation compensates for the fingerprints $F_m$ and $F_{r_n}$ having been obtained using different frequencies. A fingerprint matching circuit 90 then compares the transformed radio fingerprint $TF_m$ to the reference radio fingerprints $F_{r_n}$ and estimates the mobile terminal's location $L_m$ according to some pre-determined estimation algorithm (e.g., single nearest neighbor).

FIG. 3, of course, represents just one example wherein the mobile terminal 20 transforms the radio fingerprint $F_m$. Those skilled in the art will readily appreciate that the mobile terminal 20 may instead transform the reference radio fingerprints $F_{r_n}$, or both the radio fingerprint $F_m$ and the reference radio fingerprints $F_{r_n}$ described above. The transformation circuit 85, therefore, may alternatively receive the reference radio fingerprints $F_{r_n}$ instead of or in addition to the radio fingerprint $F_m$.

Moreover, some mobile terminals 20 may locally store the table 80 of offset amounts $\Delta SM$ instead of retrieving them from the RAN node 32. However, because the storage capacity of the mobile terminal 20 is likely more limited than that of the RAN node 32, storing this table 80 in the RAN node 32 relieves storage requirements of the mobile terminal 20.

To further relieve storage requirements of the mobile terminal 20, as well as computational complexity, the database 70 of reference radio fingerprints $F_{r_n}$ stored in the mobile terminal 20 may only describe the surrounding physical area with a limited granularity (i.e., keeping the size of the database 70 relatively small). That is, the mobile terminal's location estimate is merely a partial estimate that is later refined by another node in the wireless communication system 10. In this case, the mobile terminal 20 may send its partial location estimate and its transformed radio fingerprint $F_m$ to another node in the wireless communication system 10.

Figure 4:
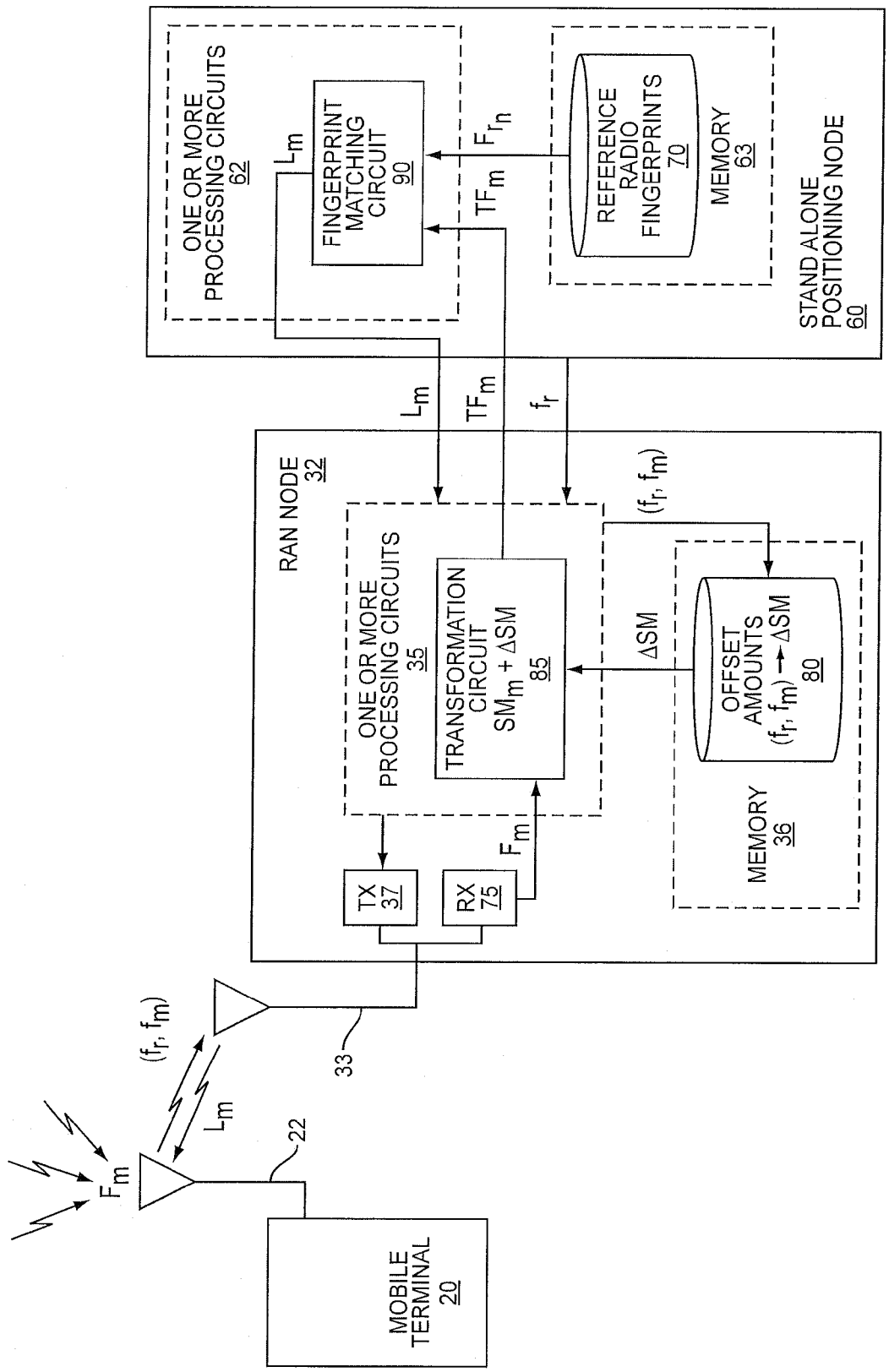
FIG. 4 is a block diagram illustrating one embodiment of a radio access network node that is configured to implement the method shown in FIG. 2.

FIG. 4 illustrates another embodiment wherein the RAN node 32, not the mobile terminal 20, transforms the radio fingerprint $F_m$. In this embodiment, the RAN node 32 stores the table 80 of offset amounts $\Delta SM$, while a positioning node 60 stores the database 70 of reference radio fingerprints $F_{r_n}$ and computes the actual estimate of the mobile terminal's location $L_m$.

The positioning node 60 as used herein may comprise a Serving Mobile Location Center (SMLC) as in GSM, an evolved SMLC (eSMLC) as in LTE, a stand-alone SMLC, or the like. The positioning node 60, therefore, may be a separate network element or functionality that is integrated into an existing network element.

In any event, the mobile terminal 20 performs the signal measurements $SM_{m,1}$, $SM_{m,2}$, $SM_{m,3}$ at radio frequency $f_m$, to acquire the radio fingerprint $F_m$ of its location $L_m$, and transmits that radio fingerprint $F_m$ to the RAN node 32. A receiver 75 in the RAN node obtains the radio fingerprint $F_m$, as well as an indication of the radio frequency $f_m$ if not already known to the RAN node 32. The RAN node 32 also obtains an indication of the reference frequency $f_r$ from the positioning node 60, if the RAN node 32 is not pre-configured therewith. One or more processing circuits 35 then retrieve the offset amount $\Delta SM$ mapped to the radio frequency $f_m$ and the reference frequency $f_r$ by the table 80 stored in the memory 36 of the RAN node 32. With this offset amount $\Delta SM$, a transformation circuit 85 in the RAN node 32 offsets the signal measurements $SM_{m,1}$, $SM_{m,2}$, $SM_{m,3}$ of the radio fingerprint $F_m$, and sends the transformed radio fingerprint $TF_m$ to the positioning node 60. A fingerprint matching circuit 90 in the positioning node 60 compares the transformed radio fingerprint $TF_m$ to reference radio fingerprints $F_{r_n}$ stored in its memory 63, and estimates the mobile terminal's location $L_m$ according to some pre-determined estimation algorithm (e.g., single nearest neighbor). The positioning node 60 sends the location estimate to the RAN node 32, which relays it back to the mobile terminal 20.

In some embodiments, the RAN node 20 has a plurality of radio frequencies available to it and may request the mobile terminal 20 to perform signal measurements $SM_{m,1}$, $SM_{m,2}$, $SM_{m,3}$ on any one of those frequencies. In this case, the transformation circuit 85 is configured to select from the available radio frequencies the frequency closest to the reference frequency $f_r$. The transmitter 37 then requests the mobile terminal 20 to perform signal measurements $SM_{m,1}$, $SM_{m,2}$, $SM_{m,3}$ at that selected radio frequency. Configured in this way, the RAN node 20 minimizes the amount $\Delta SM$ by which it offsets the signal measurements $SM_{m,1}$, $SM_{m,2}$, $SM_{m,3}$.

In other embodiments, the memory 63 in the positioning node 60 stores different sets of reference radio fingerprints $F_{r_n}$, the fingerprints in each set being obtained using a different reference frequency $f_r$. The positioning node 60 sends an indication of these different reference frequencies $f_r$ to the RAN node 32. Accordingly, the transformation circuit 85 in the RAN node 32 selects one of the different reference frequencies $f_r$, e.g., based on minimizing the difference between the selected reference frequency $f_r$ and the radio frequency $f_m$. Having selected one of the reference frequencies $f_r$, the transformation circuit 85 offsets the signal measurements $SM_{m,1}$, $SM_{m,2}$, $SM_{m,3}$ of the radio fingerprint $F_m$ by the amount $\Delta SM$ mapped to the radio frequency $f_m$ and the selected reference frequency $f_r$. The transformation circuit 85 also sends to the positioning node 60 an indication of the selected reference frequency $f_r$, so that the positioning node 60 may compare the transformed radio fingerprint $TF_m$ to the corresponding set of reference radio fingerprints $F_{r_n}$.

Figure 5:
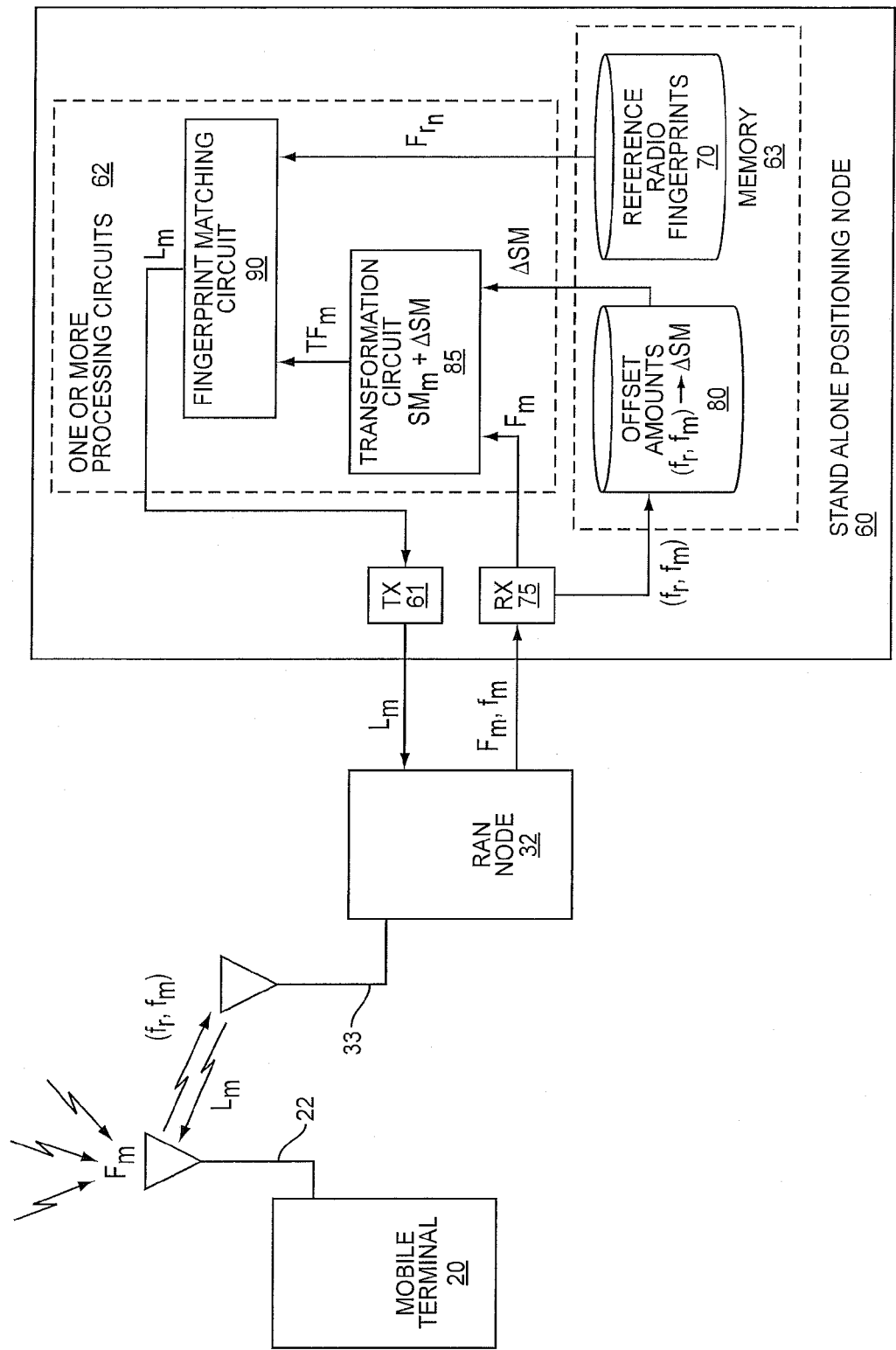
FIG. 5 is a block diagram illustrating one embodiment of a stand-alone positioning node that is configured to implement the method shown in FIG. 2.

FIG. 5 illustrates yet another embodiment wherein the positioning node 60, not the mobile terminal 20 or the RAN node 32, transforms the radio fingerprint $F_m$. In this embodiment, the positioning node 60 stores the table 80 of offset amounts $\Delta SM$ and the database 70 of reference radio fingerprints $F_{r_n}$, and also computes the actual estimate of the mobile terminal's location $L_m$.

Specifically, the mobile terminal 20 performs the signal measurements $SM_{m,1}$, $SM_{m,2}$, $SM_{m,3}$ at radio frequency $f_m$ to acquire the radio fingerprint $F_m$ of its location $L_m$, and transmits that radio fingerprint $F_m$ to the RAN node 32. The RAN node 32 relays the radio fingerprint $F_m$ to the positioning node 60. In some embodiments, the RAN node 32 modifies the radio fingerprint $F_m$, if necessary, before relaying it to the positioning node 60, while in other embodiments the RAN node 32 simply forwards the radio fingerprint $F_m$ to the positioning node 60 without regard to whether such modification is needed. Regardless, the RAN node 32 also indicates to the positioning node 60 the radio frequency $f_m$ at which the fingerprint was obtained (e.g., by tagging each signal measurement $SM_m$ with the frequency at which it was performed). The receiver 75 in the positioning node 60 obtains the radio fingerprint $F_m$ from the RAN node 32, as well as an indication of the radio frequency $f_m$. One or more processing circuits 62 then retrieve the offset amount $\Delta SM$ mapped to the radio frequency $f_m$ and the reference frequency $f_r$ by the table 80 stored in the memory 63 of the positioning node 60. With this offset amount $\Delta SM$, a transformation circuit 85 in the positioning node 60 offsets the signal measurements $SM_{m,1}$, $SM_{m,2}$, $SM_{m,3}$ of the radio fingerprint $F_m$. A fingerprint matching circuit 90 in the positioning node 60 compares the transformed radio fingerprint $TF_m$ to reference radio fingerprints $F_{r_n}$ stored in its memory 63, and estimates the mobile terminal's location $L_m$ according to some pre-determined estimation algorithm (e.g., single nearest neighbor). A transmitter 61 in the positioning node 60 sends the location estimate to the RAN node 32, which relays it back to the mobile terminal 20.

FIG. 5, of course, represents just one example wherein the positioning node 60 transforms the radio fingerprint $F_m$. Those skilled in the art will readily appreciate that the positioning node 60 may instead transform the reference radio fingerprints $F_{r_n}$, or both the radio fingerprint $F_m$ and the reference radio fingerprints $F_{r_n}$ as described above. The transformation circuit 85, therefore, may alternatively receive the reference radio fingerprints $F_{r_n}$ instead of or in addition to the radio fingerprint $F_m$.

In other embodiments, the RAN node 32 stores the table 80, and the positioning node 60 retrieves from that table 80 the offset amount $\Delta SM$ mapped to radio frequency $f_m$ and reference frequency $f_r$, much in the same way as described above with respect to FIG. 3. The transformation circuit 85 in the positioning node 60 transforms the radio fingerprint $F_m$ by offsetting signal measurements $SM_{m,1}$, $SM_{m,2}$, $SM_{m,3}$ thereof by the offset amount $\Delta SM$ received from the RAN node 32.

For ease of illustration, the above discussion has primarily focused on signal measurements $SM_{m,1}$, $SM_{m,2}$, $SM_{m,3}$ performed by the mobile terminal 20 at a single radio frequency $f_m$. Those skilled in the art, however, will appreciate that the above discussion equally applies in the case that the mobile terminal 20 performs signal measurements at multiple radio frequencies $f_m$. Specifically, a mobile terminal 20 supporting multiple frequencies (i.e., a multi-band terminal) and/or multi-band carrier aggregation (i.e. a terminal receiving data simultaneously over multiple carriers) may perform signal measurements $SM_{m,1}$, $SM_{m,2}$, $SM_{m,3}$ at each of a plurality of radio frequencies $f_m$, resulting in a plurality of radio fingerprints $F_m$ each obtained at a different radio frequency $f_m$.

In the embodiment shown in FIG. 4, for example, the mobile terminal 20 may send all of these radio fingerprints $F_m$ to the RAN node 32. The RAN node 32 may transform each of the radio fingerprints $F_m$, and send the corresponding transformed radio fingerprints $TF_m$ to the positioning node 60, which uses one or more of them for estimating the location $L_m$. Alternatively, the RAN node 32 may transform only the radio fingerprint $F_m$ obtained at a radio frequency $f_m$ closest to the reference frequency $f_r$, and send that corresponding transformed radio fingerprint $TF_m$ to the positioning node 60.

Furthermore, the above discussion has described that the database 70 of reference radio fingerprints $F_{r_n}$ the table 80 of offset amounts $\Delta SM$ are stored in the memory of either the mobile terminal 20, the RAN node 32, or the positioning node 60. Those skilled in the art will appreciate that the database 70 and/or the table 80 may be manually or automatically pre-configured in memory as such by another node in the wireless communication system 10 (e.g., by a Operational Support Systems node, an Operation and Maintenance node, or a Self Organized Network node). These nodes may also update the database 70 and/or table 80 when new frequencies become available for use in the system 10.

Those skilled in the art will also appreciate that the mobile terminal 20 may comprise a mobile telephone, a Portable Digital Assistant, a laptop computer, or the like. Moreover, those skilled in the art will appreciate that no particular communication interface standard is necessary for practicing the present invention. The wireless communication system 10, therefore, may be based on any one of a number of standardized communication implementations, including GSM, CDMA (IS-95, IS-2000), TDMA (TIA/EIA-136), wide band CDMA (W-CDMA), GPRS, long term evolution (LTE), or other type of wireless communication system.

Furthermore, those skilled in the art will appreciate that the various "circuits" described may refer to a combination of analog and digital circuits, including one or more processors configured with software and/or firmware (e.g., stored in memory) that, when executed by the one or more processors, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

Thus, it should be understood that the foregoing description and the accompanying drawings represent non-limiting examples of the methods and individual apparatuses taught herein. As such, the present invention is not limited by the foregoing description and accompanying drawings. Instead, the present invention is limited only by the following claims and their legal equivalents.

What is claimed is:

1. A method in a wireless communication system configured to estimate the location of a mobile terminal by comparing a radio fingerprint of the mobile terminal's location to one or more reference radio fingerprints of one or more reference locations, the method comprising:

obtaining a radio fingerprint of the mobile terminal's location based on signal measurements performed by the mobile terminal at a radio frequency distinct from that used to obtain the one or more reference radio fingerprints; and transforming the radio fingerprint by offsetting signal measurements of the radio fingerprint by an amount determined based on said distinction, transforming the one or more reference radio fingerprints by offsetting signal measurements of those reference radio fingerprints by an amount determined based on said distinction, or both.

2. The method of claim 1, wherein transforming the radio fingerprint, or the one or more reference radio fingerprints, or both, comprises transforming the radio fingerprint.

3. The method of claim 2, further comprising sending the transformed radio fingerprint to a node within the wireless communication system that is configured to estimate the mobile terminal's location by comparing the transformed radio fingerprint to the one or more reference radio fingerprints.

4. The method of claim 3, wherein said node is configured to compare the transformed radio fingerprint to reference radio fingerprints within one of a plurality of sets of reference radio fingerprints, each set obtained using a different pre-determined reference frequency, and wherein the method further comprises:
    selecting one of the pre-determined reference frequencies;
    offsetting signal measurements of the radio fingerprint by an amount determined based on the difference between the selected reference frequency and the radio frequency used to obtain the radio fingerprint; and
    sending an indication of the selected reference frequency to said node.

5. The method of claim 1, further comprising:
    storing the one or more reference radio fingerprints, each obtained based on signal measurements performed at a pre-determined reference frequency; and
    estimating the mobile terminal's location by comparing the radio fingerprint to the reference radio fingerprints.

6. The method of claim 5, wherein transforming the radio fingerprint, or the one or more reference radio fingerprints, or both, comprises transforming the one or more reference radio fingerprints.

7. The method of claim 1, wherein obtaining a radio fingerprint of the mobile terminal's location comprises obtaining the radio fingerprint based on measurements of at least one of path loss, signal strength, or signal quality of signals sent to the mobile terminal from a plurality of radio access network nodes.

8. The method of claim 1, further comprising transforming the radio fingerprint, or the one or more reference radio fingerprints, or both, also based on a type of radio environment in which the signal measurements are performed by the mobile terminal to obtain the radio fingerprint.

9. The method of claim 1, wherein transforming the radio fingerprint, or the one or more reference radio fingerprints, or both, based on said distinction comprises transforming the radio fingerprint, or the one or more reference radio fingerprints, or both, if the difference between the frequencies used to obtain the radio fingerprint and the one or more reference radio fingerprints exceeds a pre-determined threshold.

10. The method of claim 1, wherein transforming the radio fingerprint, or the one or more reference radio fingerprints, or both, based on said distinction comprises transforming the radio fingerprint, or the one or more reference radio fingerprints, or both, if the frequencies used to obtain the radio fingerprint and the one or more reference radio fingerprints belong to different pre-determined frequency bands.

11. The method of claim 1, wherein the method is implemented in a radio access network node within the wireless communication system, and wherein the method further comprises:
    selecting a radio frequency from a plurality of available radio frequencies as the one closest to the reference frequency used to obtain the one or more reference radio fingerprints; and
    requesting the mobile terminal to perform signal measurements at the selected radio frequency.

12. An apparatus in a wireless communication system, the system configured to estimate the location of a mobile terminal by comparing a radio fingerprint of the mobile terminal's location to one or more reference radio fingerprints of one or more reference locations, the apparatus comprising:
    a receiver configured to obtain a radio fingerprint of the mobile terminal's location based on signal measurements performed by the mobile terminal at a radio frequency distinct from that used to obtain the one or more reference radio fingerprints; and
    a transformation circuit configured to transform the radio fingerprint by offsetting signal measurements of the radio fingerprint by an amount determined based on said distinction, transforming the one or more reference radio fingerprints offsetting signal measurements of those reference radio fingerprints by an amount determined based on said distinction, or both.

13. The apparatus of claim 12, wherein the transformation circuit is configured to transform the radio fingerprint.

14. The apparatus of claim 13, wherein the transformation circuit is configured to send the transformed radio fingerprint to a node within the wireless communication system that is configured to estimate the mobile terminal's location by comparing the transformed radio fingerprint to the one or more reference radio fingerprints.

15. The apparatus of claim 14, wherein said node is configured to compare the transformed radio fingerprint to reference radio fingerprints within one of a plurality of sets of reference radio fingerprints, each set obtained using a different pre-determined reference frequency, wherein the transformation circuit is further configured to select one of the pre-determined reference frequencies, to offset signal measurements of the radio fingerprint by an amount determined based on the difference between the selected reference frequency and the radio frequency used by the mobile terminal to obtain the radio fingerprint, and to send an indication of the selected reference frequency to said node.

16. The apparatus of claim 12, further comprising a memory configured to store the one or more reference radio fingerprints, each obtained based on signal measurements performed at a pre-determined reference frequency; and a fingerprint matching circuit configured to estimate the mobile terminal's location by comparing the radio fingerprint to the reference radio fingerprints.

17. The apparatus of claim 16, wherein the transformation circuit is configured to transform the one or more reference radio fingerprints.

18. The apparatus of claim 12, wherein the receiver is configured to obtain a radio fingerprint of the mobile terminal's location by obtaining a radio fingerprint that is based on measurements of at least one of path loss, signal strength, or signal quality of signals sent to the mobile terminal from a plurality of radio access network nodes.

19. The apparatus of claim 12, wherein the transformation circuit is further configured to transform the radio fingerprint, or the one or more reference radio fingerprints, or both, also based on a type of radio environment in which the signal measurements are performed by the mobile terminal to obtain the radio fingerprint.

20. The apparatus of claim 12, wherein the transformation circuit is configured to transform the radio fingerprint, or the one or more reference radio fingerprints, or both, based on said distinction by transforming the radio fingerprint, or the one or more reference radio fingerprints, or both, if the difference between the frequencies used to obtain the radio fingerprint and the one or more reference radio fingerprints exceeds a pre-determined threshold.

21. The apparatus of claim 12, wherein the transformation circuit is configured to transform the radio fingerprint, or the one or more reference radio fingerprints, or both, based on said distinction by transforming the radio fingerprint, or the one or more reference radio fingerprints, or both, if the frequencies used to obtain the radio fingerprint and the one or more reference radio fingerprints belong to different pre-determined frequency bands.

22. The apparatus of claim 12, wherein the apparatus comprises a radio access network node within the wireless communication system, wherein the transformation circuit is further configured to select a radio frequency from a plurality of available radio frequencies as the one closest to the reference frequency used to obtain the one or more reference radio fingerprints, and wherein the apparatus further comprises a transmitter configured to request the mobile terminal to perform signal measurements at the selected radio frequency.

* * * * *